(12) United States Patent
Cavnic (10) Patent No.: US 12,030,374 B2
(45) Date of Patent: Jul. 9, 2024

(54) BEARING ARRANGEMENT OF A COMPONENT ON AN AXLE CARRIER FOR A MOTOR VEHICLE, AND MOTOR VEHICLE, IN PARTICULAR PASSENGER CAR

(71) Applicant: Bayerische Motoren Werke Aktiengesellschaft, Munich (DE)

(72) Inventor: Predrag Cavnic, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 359 days.

(21) Appl. No.: 17/596,857

(22) PCT Filed: Aug. 24, 2020

(86) PCT No.: PCT/EP2020/073587
§ 371 (c)(1),
(2) Date: Dec. 20, 2021

(87) PCT Pub. No.: WO2021/047893
PCT Pub. Date: Mar. 18, 2021

(65) Prior Publication Data
US 2022/0314766 A1 Oct. 6, 2022

(30) Foreign Application Priority Data

Sep. 11, 2019 (DE) .................. 10 2019 124 348.3

(51) Int. Cl.
*B60K 1/00* (2006.01)
*B62D 21/11* (2006.01)
*F16F 1/38* (2006.01)

(52) U.S. Cl.
CPC .............. *B60K 1/00* (2013.01); *B62D 21/11* (2013.01); *F16F 1/38* (2013.01)

(58) Field of Classification Search
CPC .............. B60K 1/00; B62D 21/11; F16F 1/38
See application file for complete search history.

(56) References Cited

U.S. PATENT DOCUMENTS

| 5,740,876 A | 4/1998 | Shimose et al. |
| 6,357,772 B1 * | 3/2002 | Pelz ........... B60G 13/00 280/124.135 |

(Continued)

FOREIGN PATENT DOCUMENTS

| CN | 201941845 U * | 8/2011 |
| CN | 201941845 U | 8/2011 |

(Continued)

OTHER PUBLICATIONS

English translation of Chinese-language Office Action issued in Chinese Application No. 202080050398.3 dated Apr. 14, 2023 (8 pages).

(Continued)

*Primary Examiner* — Jacob B Meyer
(74) *Attorney, Agent, or Firm* — Crowell & Moring LLP (57) ABSTRACT

A bearing arrangement of a component on an axle carrier which is to be mounted on a body of a motor vehicle is provided, in the case of which bearing arrangement the axle carrier has two longitudinal elements as first structural elements and at least one transverse element as a second structural element, via which the longitudinal elements are connected to one another. The component is mounted on the axle carrier via a rubber bearing which has a bearing core and a rubber element which is formed from rubber and via which the component is mounted on the axle carrier. In the installed position of the component and the axle carrier, in the vehicle vertical direction, the bearing core is arranged below a lower side, which points downwards in the vehicle vertical direction, or above an upper side, which points upwards in the vehicle vertical direction, of one of the (Continued)

structural elements, and is attached via its two ends and, as a result, in double shear to the one structural element or the component.

11 Claims, 4 Drawing Sheets

(56) References Cited

U.S. PATENT DOCUMENTS

| | | | | |
|---|---|---|---|---|
| 6,511,096 | B1* | 1/2003 | Kunert | B62D 21/11 |
| | | | | 280/124.109 |
| 7,946,377 | B2* | 5/2011 | Frasch | B62D 21/11 |
| | | | | 280/124.109 |
| 9,505,437 | B2* | 11/2016 | Leibl | B62D 21/03 |
| 11,279,407 | B2* | 3/2022 | Viereck | B60K 1/00 |
| 11,673,607 | B2* | 6/2023 | Viereck | B62D 21/11 |
| | | | | 280/124.1 |
| 2002/0100622 | A1 | 8/2002 | Shimizu et al. | |
| 2006/0260860 | A1* | 11/2006 | Byers | B60K 1/00 |
| | | | | 180/291 |
| 2007/0051549 | A1 | 3/2007 | Fukuda | |
| 2012/0160590 | A1 | 6/2012 | Wakatsuki et al. | |
| 2015/0068832 | A1* | 3/2015 | Rumpel | B62D 65/02 |
| | | | | 180/69.4 |
| 2017/0057550 | A1 | 3/2017 | Sasaki | |
| 2017/0174065 | A1* | 6/2017 | Bujak | B60K 5/1216 |
| 2018/0201322 | A1* | 7/2018 | Schmalzrieth | B62D 21/02 |
| 2018/0346030 | A1* | 12/2018 | Bauer | B60G 21/0551 |
| 2019/0023322 | A1* | 1/2019 | Haselhorst | B62D 21/11 |
| 2019/0193546 | A1* | 6/2019 | Kraft | B60G 3/20 |
| 2020/0353982 | A1 | 11/2020 | Viereck et al. | |
| 2021/0316569 | A1* | 10/2021 | Stangl | B60B 35/007 |
| 2022/0314766 | A1* | 10/2022 | Cavnic | B60K 5/1208 |

FOREIGN PATENT DOCUMENTS

| | | | | |
|---|---|---|---|---|
| CN | 205970799 U | 2/2017 | | |
| CN | 207657585 U | 7/2018 | | |
| CN | 208021163 U | 10/2018 | | |
| CN | 109501565 A | 3/2019 | | |
| DE | 10 2011 057 084 A1 | 6/2012 | | |
| DE | 10 2011 081 836 A1 | 2/2013 | | |
| DE | 10 2012 103 125 A1 | 10/2013 | | |
| DE | 10 2017 220 096 A1 | 5/2019 | | |
| DE | 10 2017 220 208 A1 | 5/2019 | | |
| DE | 10 2017 220 795 A1 | 5/2019 | | |
| DE | 102019124348 A1 * | 3/2021 | | B60K 1/00 |
| EP | 3 297 891 B1 | 5/2019 | | |
| FR | 2 928 877 A1 | 9/2009 | | |
| WO | WO-2005030516 A1 * | 4/2005 | | B60K 1/00 |
| WO | WO-2013059679 A1 * | 4/2013 | | B60G 3/20 |
| WO | WO 2016/184607 A1 | 11/2016 | | |
| WO | WO-2016184607 A1 * | 11/2016 | | B60B 35/14 |

OTHER PUBLICATIONS

International Search Report (PCT/ISA/210) issued in PCT Application No. PCT/EP2020/073587 dated Nov. 18, 2020 with English translation (five (5) pages).

German-language Written Opinion (PCT/ISA/237) issued in PCT Application No. PCT/EP2020/073587 dated Nov. 18, 2020 (seven (7) pages).

German-language Search Report issued in German Application No. 10 2019 124 348.3 dated Jul. 16, 2020 with a partial English translation (10 pages).

Chinese-language Office Action issued in Chinese Application No. 202080050398.3 dated Sep. 7, 2023 with English translation (13 pages).

* cited by examiner

BEARING ARRANGEMENT OF A COMPONENT ON AN AXLE CARRIER FOR A MOTOR VEHICLE, AND MOTOR VEHICLE, IN PARTICULAR PASSENGER CAR

BACKGROUND AND SUMMARY OF THE INVENTION

The invention relates to a bearing arrangement of a component on an axle carrier for a motor vehicle. Furthermore, the invention relates to a motor vehicle, in particular a passenger car, having the bearing arrangement.

DE 10 2011 081 836 A1 discloses an electrically driven axle of a double-track vehicle, with drive shafts which are assigned to wheels, an axle carrier and with a plurality of wheel control links which are fastened thereto. Furthermore, a motor vehicle can be gathered as known from EP 3 297 891 B1, with an axle carrier which comprises at least two longitudinal carriers which are oriented at least approximately in the vehicle longitudinal direction and at least one crossmember which connects them.

It is an object of the present invention to provide a bearing arrangement of a component on an axle carrier for a motor vehicle, and to provide a motor vehicle, with the result that mounting, which is particularly simple and favorable in terms of installation space, of the component can be realized.

According to the invention, this object is achieved by way of a bearing arrangement and by way of a motor vehicle bearing arrangement in accordance with the independent claims. Advantageous refinements with expedient developments of the invention are specified in the dependent claims.

A first aspect of the invention relates to a bearing arrangement of a component on an axle carrier for a motor vehicle, in particular for a passenger car. Here, the axle carrier is to be mounted or is mounted on a body of the motor vehicle, which body is preferably configured as a monocoque vehicle body. In other words, the axle carrier is configured separately from the body and, in particular, separately from the component, and is to be mounted or is mounted on the body. Once again in other words, the motor vehicle which is preferably configured as a passenger car comprises, in its completely manufactured state, the body which is preferably configured as a monocoque vehicle body, the component which is configured separately from the body, and the axle carrier which is configured separately from the body and separately from the component, which axle carrier is mounted on the body. Here, the component is mounted on the axle carrier and is therefore mounted on the body via the axle carrier, that is to say is attached to the body.

The axle carrier has two longitudinal elements which are also called longitudinal carriers, run, for example in the installed position of the axle carrier or the bearing arrangement, at least substantially in the vehicle longitudinal direction, and are spaced apart from one another in the vehicle transverse direction. Here, the axle carrier or the bearing arrangement assumes its installed position in the completely manufactured state of the motor vehicle and, in particular, when the motor vehicle is standing on a horizontal plane in its completely manufactured state. The longitudinal elements are also called first structural elements or are first structural elements of the axle carrier. Moreover, the axle carrier has at least one transverse element which, for example, is also called a transverse carrier and, in the installed position, runs at least substantially in the vehicle transverse direction. The longitudinal elements are connected to one another via the transverse element, in particular in such a way that the transverse element is connected to the longitudinal elements, in particular at both ends or on both sides. The transverse element is a second structural element or is also called a second structural element of the axle carrier.

In the case of the bearing arrangement, the component which is configured separately from the axle carrier and preferably also separately from the body is mounted on the axle carrier via at least one rubber bearing. In particular, the component is mounted on the axle carrier via a plurality of rubber bearings. The rubber bearing has a bearing core and a rubber element which is formed from rubber and via which the component is mounted on the axle carrier. The rubber element can be deformed elastically or elastomerically, in particular in comparison with the bearing core. As a result, the rubber element allows vibrations of the component which take place relative to the axle carrier, with the result that the rubber element allows relative movements between the axle carrier and the component, in particular in the vehicle longitudinal direction and/or in the vehicle vertical direction and/or in the vehicle transverse direction. The rubber element is deformed elastically by way of relative movements of this type between the axle carrier and the component. As a result, for example, vibration energy is converted into deformation energy, as a result of which these relative movements between the component and the axle carrier are damped by means of the rubber element. Therefore, the component is mounted on the axle carrier in a manner which is at least substantially decoupled in terms of vibration and/or noise, for example via the rubber bearing, with the result that mounting, which is advantageous in terms of vibration and noise, of the component on the axle carrier and, in particular, on the body can be provided.

In order for it then to be possible for mounting, which is particularly simple and can therefore be manufactured in little time and inexpensively and is particularly favorable in terms of installation space, of the component to be realized, in particular on the axle carrier or on the body, the bearing core is arranged, in the installed position of the component and the axle carrier, in the vehicle vertical direction below a lower side, which points downward in the vehicle vertical direction, of one of the structural elements. Here, the component and the axle carrier assume their installed position in the completely manufactured state of the motor vehicle. As an alternative, the bearing core is arranged, in the installed position of the component of the axle carrier, in the vehicle vertical direction above an upper side, which points upward in the vehicle vertical direction, of the one structural element.

Moreover, the bearing core which is arranged below the lower side or above the upper side is attached at its two ends or via its two ends and, as a result, in double shear to the one structural element or the component. By virtue of the fact that the bearing core is arranged above the upper side or below the lower side, it can be avoided that the bearing core is arranged between the longitudinal elements, in particular in the vehicle transverse direction. As a result, for example in the case of a given spacing which runs between the longitudinal elements in the installed position of the axle carrier in the vehicle transverse direction, an installation space which is arranged between the longitudinal elements in the vehicle transverse direction can be utilized particularly advantageously and, in particular, particularly comprehensively, in particular at least approximately completely, in order to arrange the component in the installation space. As a result, for example, advantageously great external dimensions of the component can be realized. As a consequence, for example when the component is configured as a machine, particularly great power outputs of the machine can be realized. Furthermore, it is possible, for example in the case of a given width, which runs in the vehicle transverse direction in the installed position of the axle carrier, of the axle carrier overall and in the case of given external dimensions of the component, for the axle carrier to be of particularly rigid and at the same time particularly low-weight configuration. In other words, the arrangement of the bearing core above the upper side or below the lower side makes it possible for the available installation space to be utilized particularly advantageously, in order to arrange, for example, the large component, in particular between the longitudinal elements, and/or to make it possible for the axle carrier to be of particularly rigid and low-weight configuration.

Furthermore, it is possible, by way of the double shear attachment of the bearing core to the one structural element or to the component, for an excessive installation space requirement and an excessive weight of the rubber bearing to be avoided, with the result that a mounting which is particularly favorable in terms of installation space and weight can be produced. An attachment, in the case of which the bearing core would be attached only via precisely one end of the bearing core to the one structural element or to the component, would be called a single shear attachment of the bearing core to the one structural element or to the component. In the case of a single shear attachment of this type, for example, torques would result from forces which act on the bearing core in the radial direction of the bearing core, which torques have to be absorbed and supported by way of the rubber element. As a consequence, the rubber element or the rubber bearing overall would have to be configured in a manner which is particularly solid and therefore intensive in terms of weight and installation space. According to the invention, this can then be prevented by way of the double shear attachment of the bearing core to the one structural element or to the component. Since the bearing core is attached at its two ends or via its two ends to the one structural element or to the component, that is to say since the two ends of the bearing core are attached to the one structural element or to the component, no torques which would have to be supported via the rubber element result, for example, from forces which act on the bearing core in the radial direction of the bearing core, that is to say which act on the bearing core, for example, in the vehicle longitudinal direction and/or in the vehicle transverse direction and/or in the vehicle vertical direction. As a result, the rubber bearing can be designed in a manner which is particularly delicate and therefore favorable in terms of weight and installation space.

Furthermore, the bearing arrangement according to the invention makes it possible for the component to be mounted via the rubber bearing on the axle carrier in such a way that the component moves relative to the axle carrier upward in the vehicle vertical direction or downward in the vehicle vertical direction and, as a result, is moved into an assembly position, for example. In the assembly position, for example, the component is connected to the rubber bearing, with the result that the component is mounted via the rubber bearing on the axle carrier as a result. In other words, it is possible in the case of the bearing arrangement for the component to be inserted in a particularly simple and therefore inexpensive way downward in the vehicle vertical direction or upward in the vehicle vertical direction into the axle carrier and in the process, for example, between the longitudinal elements, as a result of which the component can be attached in a manner which is particularly simple and therefore favorable in terms of time and costs to the rubber bearing and via the rubber bearing to the axle carrier.

The rubber bearing is, for example, an adapter which is configured separately from the axle carrier and separately from the component and separately from the body, which adapter can be manufactured, for example, independently of the axle carrier and, in the state in which it is manufactured independently of the axle carrier, can be mounted, in particular premounted, on the axle carrier, in particular while the rubber bearing is released from the component and the component is released from the axle carrier. After assembly, in particular before assembly, of the adapter on the axle carrier, the component can be connected to the rubber bearing, in particular in the above-described way, and can therefore be attached via the rubber bearing to the axle carrier or can be mounted on the axle carrier. For example, the adapter is screwed to the axle carrier and, as a result, is connected to the axle carrier. As an alternative or in addition, in particular afterward, the component is screwed to the adapter and, as a result, is connected to the adapter. To this end, it has been shown to be particularly advantageous if the adapter is of undercut-free design with respect to the component which is also called an assembly or is also configured as an assembly, in particular in accordance with an assembly direction, in which or along which the component is moved relative to the axle carrier and, in particular, relative to the adapter which is already connected to the axle carrier, in order, as a result, to insert the component into the axle carrier, for example. The assembly direction runs, for example, from the top to the bottom in the vehicle vertical direction, in particular when the component is moved from the top to the bottom in the vehicle vertical direction relative to the axle carrier and relative to the adapter which is fastened to the axle carrier, in order, as a result, to insert the component into the axle carrier and subsequently to connect it to the adapter. Furthermore, it is conceivable that the assembly direction runs from the bottom to the top in the vehicle vertical direction, with the result that then, for example, the component, as described above, is inserted from the bottom to the top in the vehicle vertical direction into the axle carrier.

It has been shown to be particularly advantageous if, in the installed position, the lower side is covered downward in the vehicle vertical direction or by way of the bearing core. As an alternative, in the installed position, the upper side is covered upward in the vehicle vertical direction by way of the bearing core. As a result, an excessive width of the bearing arrangement overall can be avoided, with the result that mounting which is particularly favorable in terms of installation space can be realized.

In order for it to be possible for the component to be mounted on the axle carrier and therefore on the body in a way which is particularly simple and favorable in terms of installation space, it is provided in a further refinement of the invention that a first one of the ends of the bearing core is connected to a first bracket, and is attached as a result via the first bracket to the one structural element, in particular to the lower side or the upper side. Here, the bracket projects from the lower side downward in the vehicle vertical direction or from the upper side upward in the vehicle vertical direction. The second end of the bearing core is connected to a second bracket and, as a result, is attached via the second bracket to the one structural element, in particular to its lower side or upper side. Here, the second bracket projects from the lower side downward in the vehicle vertical direction or from the upper side upward in the vehicle vertical direction.

In order for it to be possible for the component to be mounted in a way which is particularly simple and therefore favorable in terms of time and costs and particularly favorable in terms of installation space, it is provided in the case of a further embodiment of the invention that the bearing core is attached via its two ends to the one structural element, and is connected via the rubber element to a bearing element of the rubber element, which bearing element is configured separately from the component, separately from the axle carrier, separately from the rubber element and separately from the bearing core. To this end, the rubber element which is connected, for example, to the bearing core is connected to the bearing element. For example, the rubber element is connected by way of vulcanization to the bearing core and/or to the bearing element. The bearing element is, for example, a housing, the rubber element being arranged in the bearing element, for example, at least partially, in particular at least predominantly or completely. Furthermore, for example, the bearing core is arranged in the rubber element at least partially, in particular at least predominantly or completely, and is connected via the rubber element to the bearing element. Here, the component is fastened to the bearing element at least indirectly, in particular directly. Since the rubber element is formed from rubber, the rubber element can be deformed elastically. As a result, the rubber element allows relative movements between the bearing core and the bearing element. Since, for example, the bearing core is attached, in particular via the brackets, to the one structural element and the bearing element is attached to the bearing core, relative movements between the bearing core and the bearing element result from relative movements between the component and the axle carrier. By way of these relative movements, the rubber element is deformed elastically, as a result of which vibration energy is converted into deformation energy. As a consequence, the relative movements are damped by means of the rubber element. In the case of this embodiment, the component is connected via the bearing element to the rubber element and via the rubber element to the bearing core and via the bearing core to the axle carrier. As a result, particularly advantageous mounting of the component can be produced.

Here, it has been shown to be particularly advantageous if the bearing element has a supporting face which, in relation to the installed position, runs in a plane which is defined by the vehicle longitudinal direction and the vehicle transverse direction, the component being supported on the supporting face toward the top in the vehicle vertical direction or toward the bottom in the vehicle vertical direction, in particular directly or at least indirectly. As a result, it is possible for the component to be moved particularly simply in the assembly direction and therefore, for example, from the bottom to the top in the vehicle vertical direction or from the top to the bottom in the vehicle vertical direction and, as a result, to be brought into supporting contact with the supporting face. As a result, for example, the component can be moved particularly simply into the abovementioned assembly position, whereupon the component can be connected particularly advantageously to the rubber bearing, in particular to the bearing element. As a result, it is possible, in particular, for the component to be inserted into the axle carrier in a particularly advantageous manner.

In order for the component to be inserted into the axle carrier in a way which is particularly simple and, in particular, free from collisions, the supporting face is arranged, for example, without an overlap with respect to the longitudinal elements toward the top in the vehicle vertical direction and/or toward the bottom in the vehicle vertical direction.

In order for it to be possible for the component to be mounted particularly simply and, in particular, to be moved into the assembly position particularly simply, it is provided in a further refinement of the invention that the bearing element has a second supporting face which, in relation to the installed position, runs in a second plane which is defined by the vehicle longitudinal direction and the vehicle vertical direction or in a second plane which is defined by the vehicle transverse direction and the vehicle vertical direction. Here, the component is supported, in particular directly or at least indirectly, on the second supporting face toward the outside in the vehicle transverse direction, toward the front in the vehicle longitudinal direction or toward the rear in the vehicle longitudinal direction. The component can be mounted particularly simply, for example, by virtue of the fact that the component is moved relative to the bearing element and in the process is moved into supporting contact with the first supporting face and into supporting contact with the second supporting face. As a result, the component is moved into the assembly position particularly simply, whereupon the component can be connected to the bearing element and therefore to the rubber bearing.

The respective supporting face is formed, for example, by way of a respective wall of the bearing element. It has been shown to be particularly advantageous here if the first supporting face and the second supporting face are formed by way of a single-piece wall of the bearing element. As a result, the installation space requirement, the weight and the costs of the bearing arrangement can be kept within particularly low limits.

It has been shown to be particularly advantageous, furthermore, if the component has or is a drive unit, by means of which the motor vehicle can be driven. The component is therefore, for example, a particularly large and heavy component which can be mounted on the body in a particularly advantageous manner in the case of the bearing arrangement according to the invention.

Finally, it has been shown to be particularly advantageous if the component, in particular the drive unit, is an electric machine for electrically driving the motor vehicle.

A second aspect of the invention relates to a motor vehicle which is preferably configured as a passenger car, with a body which is preferably configured as a monocoque vehicle body. Moreover, the motor vehicle comprises an axle carrier which is configured separately from the body and comprises at least or precisely two longitudinal elements which are spaced apart from one another in the vehicle transverse direction. The longitudinal elements are also called first structural elements, or are first structural elements of the axle carrier. Moreover, the axle carrier comprises at least one transverse element, via which the longitudinal elements are connected to one another. The transverse element is also called a second structural element or is a second structural element of the axle carrier. Moreover, the motor vehicle comprises a component which is configured separately from the body and separately from the axle carrier, is provided in addition thereto, and is mounted on the axle carrier via at least one rubber bearing. The rubber bearing has a bearing core and a rubber element which is formed from rubber and via which the component is mounted on the axle carrier.

In order for it then to be possible for mounting, which is simple and particularly favorable in terms of installation space, of the component to be realized, it is provided in the case of the second aspect of the invention that the bearing core is arranged, in the installed position of the component and of the axle carrier, in the vehicle vertical direction below a lower side, which points downward in the vehicle vertical direction, of one of the structural elements. As an alternative, the bearing core is arranged, in the installed position of the component and of the axle carrier, in the vehicle vertical direction above an upper side, which points upward in the vehicle vertical direction, of the one structural element. Moreover, the bearing core which is arranged below the lower side or above the upper side is attached via its two ends and, as a result, in double shear to the one structural element or the component. In other words, the bearing core preferably has precisely two ends, the bearing core being attached via its two ends and therefore in double shear to the one structural element or to the component, that is to say being connected to the one structural element or to the component. Advantages and advantageous refinements of the first aspect of the invention are to be considered to be advantages and advantageous refinements of the second aspect of the invention, and vice versa.

Further details of the invention result from the following description of preferred exemplary embodiments with the associated drawings.

BRIEF DESCRIPTION OF THE DRAWINGS

In the figures, identical or functionally identical elements are provided with identical designations.

DETAILED DESCRIPTION OF THE DRAWINGS

Figure 1:
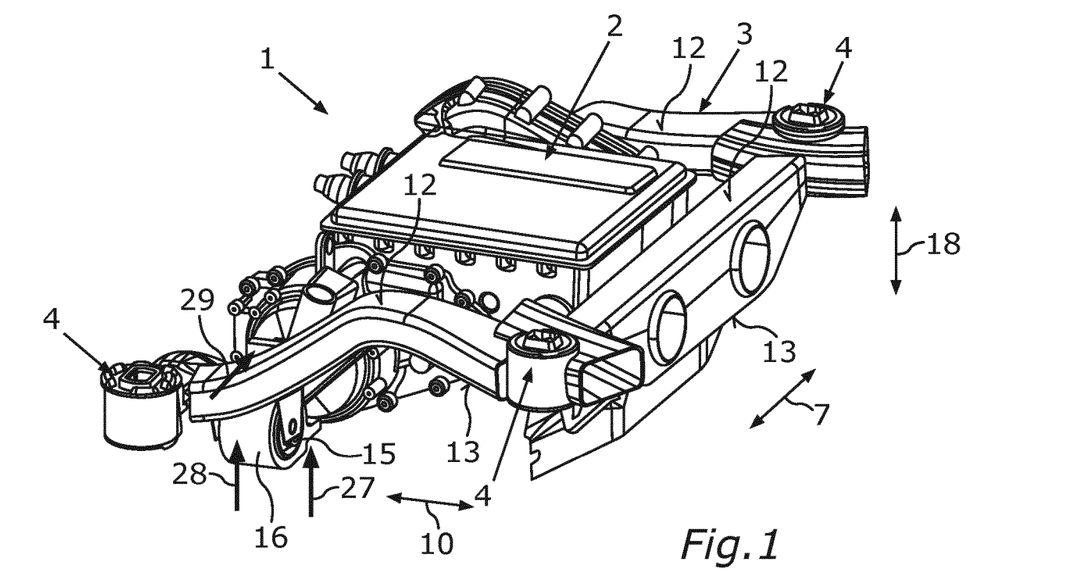
FIG. 1 shows a diagrammatic perspective view of a bearing arrangement according to the invention in accordance with a first embodiment.

FIG. 1 shows a diagrammatic perspective view of a first embodiment of a bearing arrangement 1 of a component 2 for an axle carrier 3 for a motor vehicle which is preferably configured as a passenger car. The motor vehicle has, in its completely manufactured state, a body which is preferably configured as a monocoque vehicle body. Moreover, in its completely manufactured state, the motor vehicle comprises the bearing arrangement 1 and therefore the component 2 and the axle carrier 3. The axle carrier 3 is configured separately from the body, and is mounted on the body, in particular elastically, at at least, or precisely, four bearing points 4. To this end, the respective bearing point 4 comprises, for example, a respective rubber bearing, via which the axle carrier 3 is mounted, in particular elastically, on the body. The component 2 is configured separately from the body and separately from the axle carrier 3.

Figure 2:
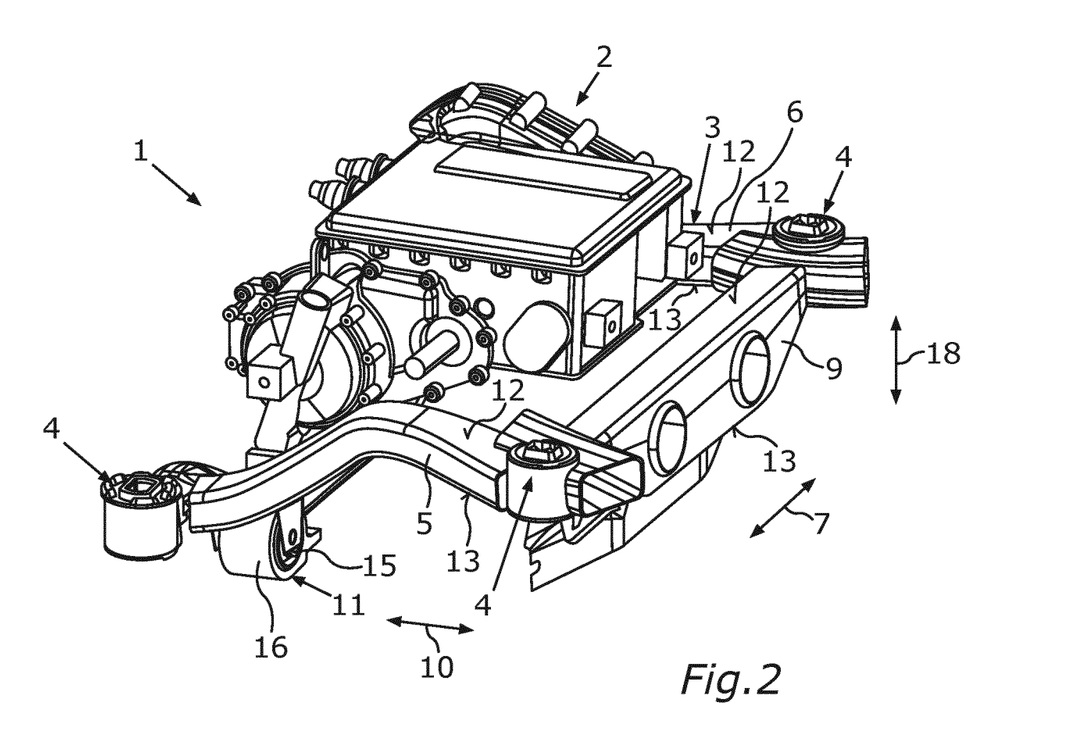
FIG. 2 shows a diagrammatic exploded illustration of the bearing arrangement in accordance with the first embodiment.
Figure 3:
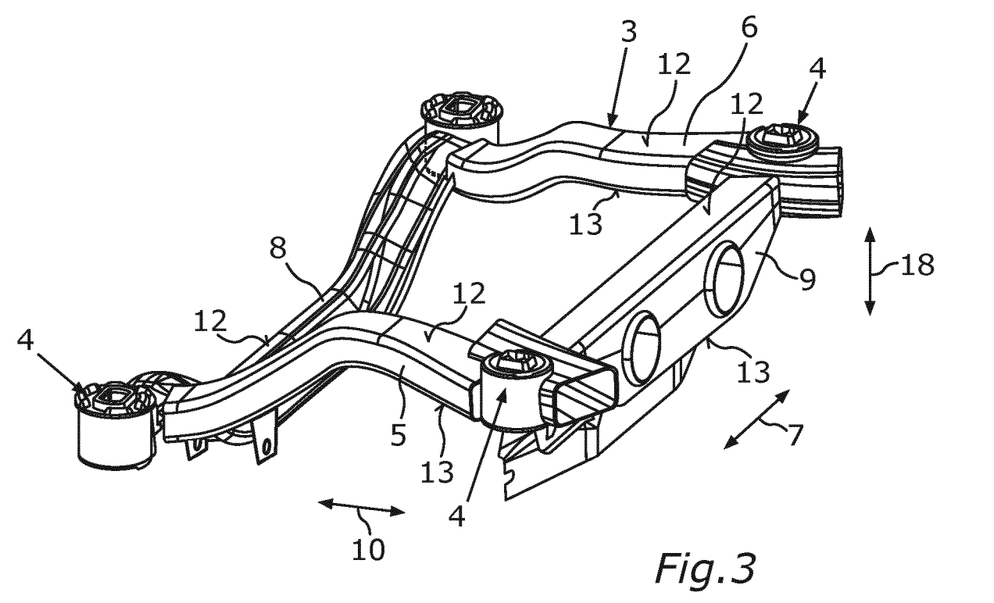
FIG. 3 shows a diagrammatic perspective view of an axle carrier of the bearing arrangement in accordance with the first embodiment.

In its completely manufactured state, for example, the motor vehicle has at least, or precisely, two axles which are arranged behind one another in the vehicle longitudinal direction and therefore follow one another, a first one of the axles being a front axle and the second axle being a rear axle. The axle carrier 3 and the component 2 are assigned to one of the axles, in particular the rear axle, with the result that the axle carrier 3 is, for example, a rear axle carrier. The respective axle has, for example, at least, or precisely, two wheels which are also called vehicle wheels and are spaced apart from one another in the vehicle transverse direction, it being possible for the wheels of the axle which is assigned the component 2 and the axle carrier 3 to be driven electrically by means of the electric machine. As a result, the motor vehicle overall can be driven electrically. The motor vehicle is therefore preferably a hybrid vehicle or else an electric vehicle, in particular a battery electric vehicle. As can be seen particularly clearly in combination with FIGS. 2 to 4, the axle carrier 3 has, in particular precisely, two longitudinal elements 5 and 6 which are also called longitudinal carriers and are spaced apart from one another in the vehicle transverse direction. Here, the vehicle transverse direction is illustrated in FIG. 1 by way of a double arrow 7. Moreover, the axle carrier 3 comprises at least, or precisely, two transverse elements 8 and 9 which are spaced apart from one another in the vehicle longitudinal direction and are also called crossmembers. The vehicle longitudinal direction is illustrated in FIG. 1 by way of a double arrow 10. The transverse elements 8 and 9 are connected on both sides or at both ends to the longitudinal elements 5 and 6, as a result of which the longitudinal elements 5 and 6 are connected to one another via the transverse elements 8 and 9. The axle carrier 3 therefore has a frame structure or is configured as a frame which, for example, is also called a subframe or an auxiliary carrier.

Figure 4:
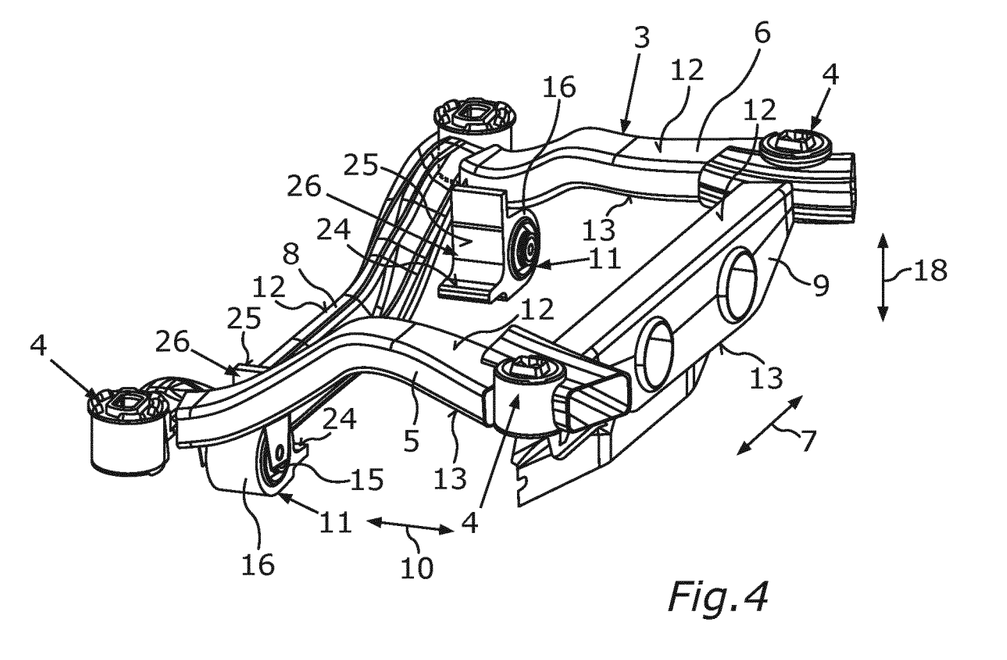
FIG. 4 shows a further diagrammatic perspective view of the axle carrier, to which adapters in the form of rubber bearings are attached.

The component 2 which is configured separately from the axle carrier 3 and separately from the body is mounted on the axle carrier 3 via rubber bearings 11 which can be seen particularly clearly from FIG. 4. The respective rubber bearing 11 is an adapter which is configured separately from the axle carrier 3, separately from the component and separately from the body, which adapter is fastened, in particular independently of the body and independently of the component 2, to the axle carrier 3 and is therefore attached to the axle carrier 3. The longitudinal elements 5 and 6 and the transverse elements 8 and 9 are also called structural elements of the axle carrier 3. Here, the respective structural element has an upper side 12 which points upward in the vehicle vertical direction and a lower side 13 which points downward in the vehicle vertical direction and therefore faces away from the upper side 12 in the vehicle vertical direction. Moreover, the component 2 is mounted on the axle carrier 3, in particular elastically, via the rubber bearings 11.

Figure 5:
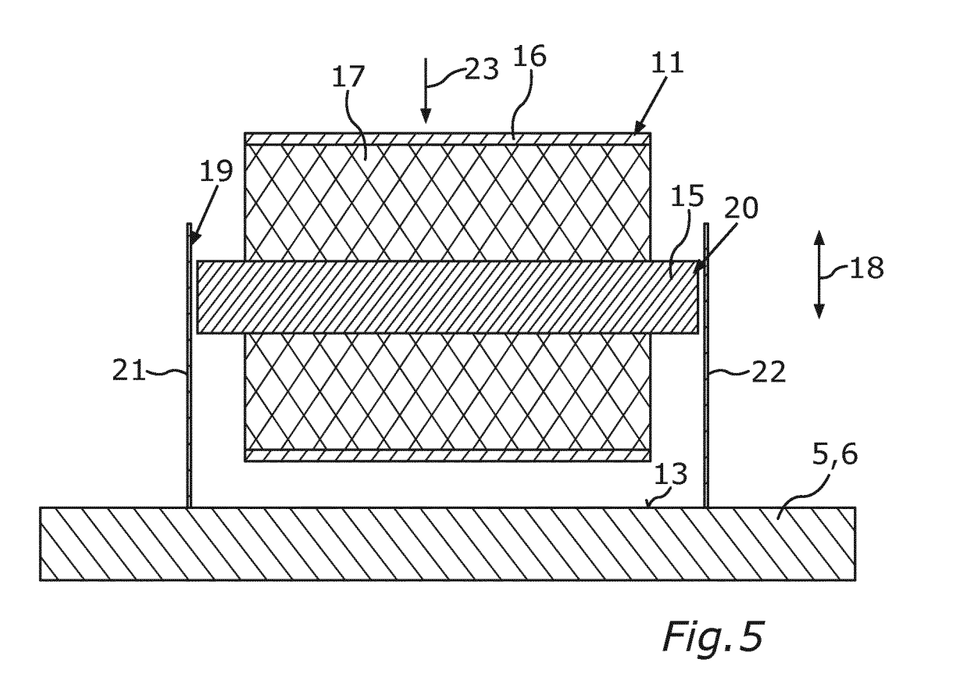
FIG. 5 shows a diagrammatic sectional view of one of the rubber bearings according to FIG. 4.

FIG. 5 shows one of the rubber bearings 11 in a diagrammatic longitudinal sectional view, FIG. 5 showing, for example, details of the longitudinal element 5 or 6. It can be seen from FIG. 5 that the respective rubber bearing 11 has a bearing core 15 which is, in particular, rigid or stiff and a bearing element 16 which is, in particular, rigid or stiff, the bearing element 16 also being called a bearing housing. Moreover, the respective rubber bearing 11 comprises a rubber element 17 which is formed from rubber, that is to say from an elastically deformable material. The rubber element 17 is connected to the bearing core 15 and to the bearing element 16, for example by way of vulcanization, with the result that the bearing core 15 is connected via the rubber element 17 to the bearing element 16. The rubber element 17 allows relative movements between the bearing core 15 and the bearing element 16. In the case of relative movements of this type between the bearing core 15 and the bearing element 16, the rubber element 17 is deformed, as a result of which vibration energy is converted into deformation energy. As a result, the relative movements between the bearing core 15 and the bearing element 16 are damped.

In order for it then to be possible for mounting, which is particularly simple and therefore inexpensive and low-weight and particularly favorable in terms of installation space, of the component 2 on the axle carrier 3 and therefore on the body, which is shown particularly diagrammatically in FIG. 4, can be seen in details and is denoted there by 14, to be realized, the bearing core 15 is arranged, in the case of the first embodiment of the bearing arrangement 1 which is shown in FIGS. 1 to 7, in the vehicle vertical direction below the respective lower side 13 of the respective longitudinal element 5 or 6 in the installed position of the component 2 and of the axle carrier 3, the bearing core 15 being attached via its two ends 19 and 20 and, as a result, in double shear to the respective longitudinal element 5 or 6, as can be seen particularly clearly from FIG. 5. In other words, the bearing core 15 has precisely two ends 19 and 20, the bearing core 15 being attached via its two ends 19 and 20 and therefore in double shear to the longitudinal element 5 or 6, that is to say being connected to the longitudinal element 5 or 6. The component 2 and the axle carrier 3 assume their installed position in the completely manufactured state of the motor vehicle, in particular, when the motor vehicle is standing on a horizontal plane, that is to say when the motor vehicle is supported downward in the vehicle vertical direction on a horizontal plane via its wheels.

As can be seen particularly clearly from FIG. 4, the lower side 13 of the respective longitudinal element 5 or 6 is covered toward the bottom in the vehicle vertical direction by way of the respective bearing core 15 in the installed position. Here, the vehicle vertical direction is illustrated by way of a double arrow 18.

Figure 6:
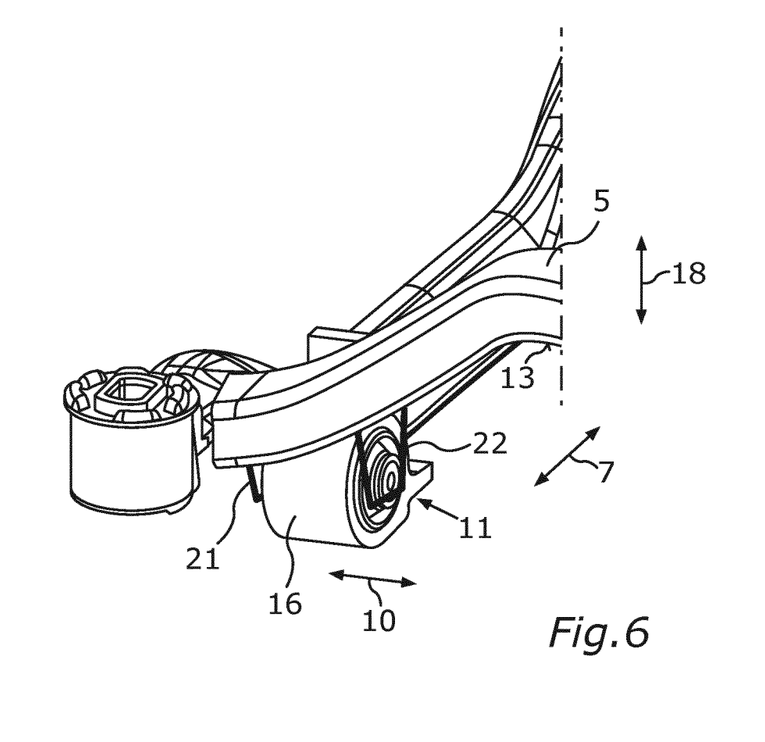
FIG. 6 shows details of a diagrammatic perspective view of the axle carrier according to FIG. 4.

As can be seen particularly clearly from FIGS. 5 and 6, a first bracket 21 projects downward in the vehicle vertical direction from the respective lower side 13 of the respective longitudinal element 5 or 6. Moreover, a respective second bracket 22 which is, for example, spaced apart from the first bracket 21 in a vehicle longitudinal direction projects downward in the vehicle vertical direction from the respective lower side 13 of the respective longitudinal element 5 or 6. Here, the bearing core 15 is configured separately from the brackets 21 and 22. Moreover, the bearing core 15 is arranged between the brackets 21 and 22. The end 19 which is also called a first end is connected at least indirectly, in particular directly, to the bracket 21, and the end 20 which is also called a second end is connected at least indirectly, in particular directly, to the second bracket 22. Therefore, the bearing core 15 is connected via its first end 19 to the bracket 21 and via its second end 20 to the second bracket 22, with the result that the bearing core 15 is attached via its ends 19 and 20 and via the brackets 21 and 22 to the respective lower side 13 and therefore to the respective longitudinal element 5 or 6. The brackets 21 and 22 are configured, for example, in one piece with the longitudinal element 5 or 6. Furthermore, it is conceivable that the brackets 21 and 22 are configured separately from one another and/or separately from the respective longitudinal element 5 or 6, and are connected to the respective longitudinal element 5 or 6, in particular by way of welding. For example, the respective bracket 21 or 22 is welded onto the lower side 13. For example, the bearing core 15 is screwed via its ends 19 and 20 or at its ends 19 and 20 to the respective brackets 21 and 22, and is connected to the brackets 21 and 22 as a result.

The respective rubber bearing 11 which is configured as a respective adapter is attached, for example, via the bearing core 15 to the respective longitudinal element 5 or 6 in such a way, and therefore to the axle carrier 3 in such a way, that, for example, the respective rubber bearing 11 is moved upward in the vehicle vertical direction relative to the axle carrier 3, that is to say is moved in a translational manner, in such a way that the bearing core 15 is plugged between the brackets 21 and 22, in particular from the bottom to the top in the vehicle vertical direction. Thereupon, for example, the bearing core 15 is connected to the brackets 21 and 22. Thereupon, for example, the component 2 is moved, in particular in a translational manner, in an assembly direction (illustrated by way of an arrow 23 in FIG. 5) relative to the axle carrier 3 and relative to the rubber bearings 11 which are connected to the axle carrier 3. In the case of the first embodiment, the assembly direction runs downward in the vehicle vertical direction, that is to say from the top to the bottom in the vehicle vertical direction. As a result, the component 2 is inserted into the axle carrier 3, since the component 2 is arranged between the longitudinal elements 5 and 6 in such a way that the component 2 is covered toward the outside in the vehicle transverse direction in each case at least partially by way of the longitudinal elements 5 and 6. In particular, the component 2 is moved in the assembly direction relative to the rubber bearings 11 until the component 2 comes into supporting contact with supporting faces 24 of the bearing element 16. This means that the supporting faces 24 of the bearing element 16 are formed. The respective supporting face 24 runs in a plane which is defined by the vehicle transverse direction and the vehicle longitudinal direction. For example, the component 2 is supported directly on the supporting faces 24 and, as a result, is placed onto the supporting face 24, for example, from the top to the bottom in the vehicle vertical direction. The component 2 is then situated in an assembly position which is also called an assembly location. In the assembly position, the component 2 is connected to the bearing element 16, in particular by virtue of the fact that the component 2 is screwed to the bearing element 16. The component 2 is therefore supported downward in the vehicle vertical direction on the supporting faces 24, is connected to the bearing elements 16 and, as a result, is mounted via the rubber bearings 11 on the axle carrier 3.

Moreover, the respective bearing element 16 has, for example, a second supporting face 25 which, in the present case, runs, for example, in a second plane which is defined by the vehicle longitudinal direction and the vehicle vertical direction. Here, for example, the component 2 can be supported or is supported toward the outside in the vehicle transverse direction on the respective second supporting face 25. The supporting faces 24 and 25 are formed, for example, by way of a single-piece wall 26 of the bearing element 16.

Figure 7:
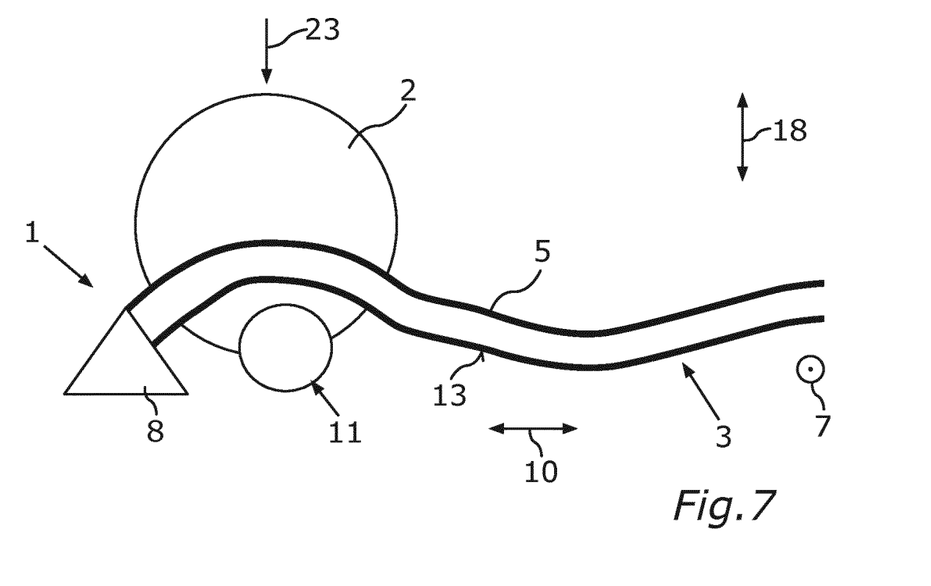
FIG. 7 shows a diagrammatic side view of the bearing arrangement in accordance with the first embodiment.
Figure 8:
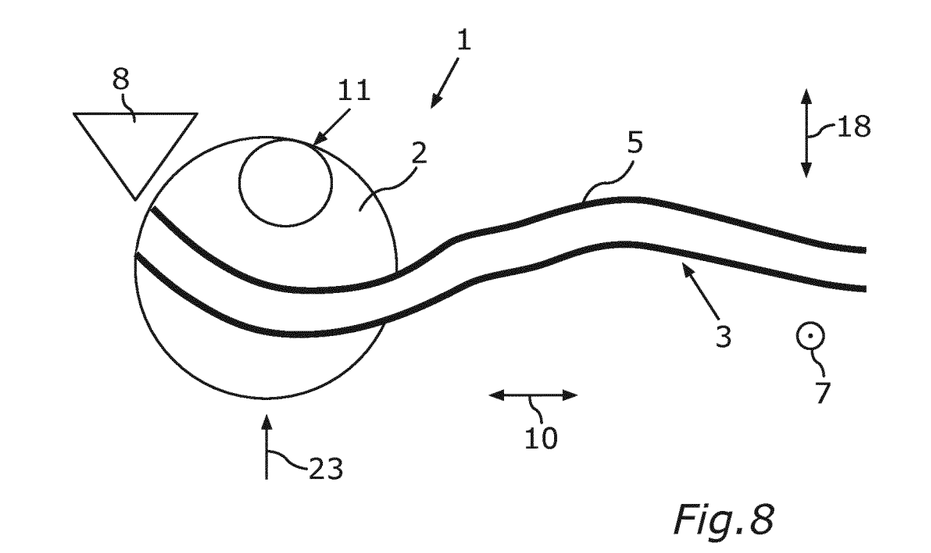
FIG. 8 shows a diagrammatic side view of the bearing arrangement in accordance with a second embodiment.

FIG. 7 shows the first embodiment of the bearing arrangement 1 in a diagrammatic side view. In contrast, FIG. 8 shows a second embodiment of the bearing arrangement 1. In the case of the second embodiment, the assembly direction (illustrated by way of the arrow 23) runs upward in the vehicle vertical direction, that is to say from the bottom to the top in the vehicle vertical direction. In the case of the second embodiment, the component 2 is inserted into the axle carrier 3, for example, in such a way that the component 2 is moved, in particular in a translational manner, relative to the axle carrier 3 from the bottom to the top in the vehicle vertical direction, relative to the axle carrier 3 and, in particular, relative to the rubber bearings 11 which are connected to the axle carrier 3. Here, the component 2 is moved in the assembly direction relative to the axle carrier 3 and relative to the rubber bearings 11 which are fastened to the axle carrier 3 until the component 2 again comes into supporting contact with the supporting faces 24. Therefore, in the case of the second embodiment, the component 2 is supported upward in the vehicle vertical direction on the supporting faces 24. Thereupon, the component 2 is connected, in particular via its housing, to the bearing element 16, in particular is screwed to the bearing element 16.

In FIG. 1, respective screw connections of the component 2 to the bearing element 16 are illustrated by way of arrows 27, 28, 29. The screw connections 27, 28 take place or run, for example, in the vehicle vertical direction, with the result that the component 2 is screwed to the bearing element 16 in the vehicle vertical direction, for example, and, as a result, is mounted via the bearing element 16, the rubber element 17 and the bearing core 15 on the axle carrier 3. The screw connection 29 takes place or runs, for example, in the vehicle transverse direction, with the result that, for example, the component 12 is screwed to the bearing element 16, as an alternative or in addition, in the vehicle transverse direction, and is subsequently mounted via the respective rubber bearing 11 on the axle carrier 3.

LIST OF DESIGNATIONS

1 Bearing arrangement
2 Component
3 Axle carrier
4 Bearing point
5 Longitudinal element
6 Longitudinal element
7 Double arrow
8 Transverse element
9 Transverse element
10 Double arrow
11 Rubber bearing
12 Upper side
13 Lower side
14 Body
15 Bearing core
16 Bearing element
17 Rubber element
18 Double arrow
19 End
20 End
21 Bracket
22 Bracket
23 Arrow
24 Supporting face
25 Supporting face
26 Wall
27 Arrow
28 Arrow
29 Arrow

What is claimed is:

1. A bearing arrangement of a component on an axle carrier which is to be mounted on a body of a motor vehicle, wherein
the axle carrier has two longitudinal elements as first structural elements and at least one transverse element as a second structural element, via which the two longitudinal elements are connected to one another, the bearing arrangement comprising:
at least one rubber bearing by which the component is mountable on the axle carrier, the at least one rubber bearing having a bearing core and a rubber element surrounding the bearing core, wherein
the bearing core is arranged, in an installed position of the component and the axle carrier, in a vehicle vertical direction below a lower side facing downward in the vehicle vertical direction or above an upper side facing upward in the vehicle vertical direction of one of the first and second structural elements, and
the bearing core is attached via its two ends and, as a result, in double shear, to said one structural element or the component.

2. The bearing arrangement according to claim 1, wherein in the installed position, the lower side is aligned downward in the vehicle vertical direction, or the upper side is aligned upward in the vehicle vertical direction, with the bearing core.

3. The bearing arrangement according to claim 1, wherein a first one of the two ends of the bearing core is connected to a first bracket, which projects from the lower side or the upper side, and is attached as a result via the first bracket to the one structural element, and
a second one of the two ends of the bearing core is connected to a second bracket, which projects from the lower side or the upper side, and is attached as a result via the second bracket to the one structural element.

4. The bearing arrangement according to claim 1, wherein the bearing core is attached via its two ends to the one structural element, and is connected via the rubber element to a bearing element which is configured separately from the component, separately from the axle carrier, separately from the rubber element and separately from the bearing core, to which bearing element the component is fastened at least indirectly.

5. The bearing arrangement according to claim 4, wherein the bearing element has a supporting face which, in relation to the installed position, runs in a plane which is defined by the vehicle longitudinal direction and the vehicle transverse direction, and
the component is supported on the supporting face toward a top or toward a bottom in the vehicle vertical direction.

6. The bearing arrangement according to claim 5, wherein the bearing element has a second supporting face which, in relation to the installed position, runs in a second plane which is defined by the vehicle longitudinal direction and the vehicle vertical direction or in a second plane which is defined by the vehicle transverse direction and the vehicle vertical direction, and
the component is supported on the second supporting face toward the outside in the vehicle transverse direction, toward the front in the vehicle longitudinal direction or toward the rear in the vehicle longitudinal direction.

7. The bearing arrangement according to claim 6, wherein the first and second supporting faces are formed by way of a single-piece wall of the bearing element.

8. The bearing arrangement according to claim 5, wherein the supporting face is formed by way of a single-piece wall of the bearing element.

9. The bearing arrangement according to claim 1, wherein the component has a drive unit by which the motor vehicle is driven.

10. The bearing arrangement according to claim 9, wherein
the drive unit is an electric machine.

11. A motor vehicle, comprising:
a body;
an axle carrier which is configured separately from the body, is mounted on the body, and has two longitudinal elements as first structural elements and at least one transverse element as a second structural element, via which the longitudinal elements are connected to one another;
a component which is mounted on the axle carrier; and
at least one rubber bearing which has a bearing core and a rubber element surrounding the bearing core, and via which rubber bearing the component is mounted on the axle carrier,
wherein
the bearing core is arranged, in an installed position of the component and the axle carrier, in a vehicle vertical direction below a lower side facing downward in the vehicle vertical direction or above an upper side facing upward in the vehicle vertical direction, of one of the structural elements, and is attached via its two ends and, as a result, in double shear, to the one structural element or the component.

\* \* \* \* \*